(12) United States Patent
Hahn

(10) Patent No.: US 11,647,558 B2
(45) Date of Patent: May 9, 2023

(54) METHOD AND APPARATUS FOR RADIO LINK MANAGEMENT IN SIDELINK COMMUNICATION

(71) Applicants: Hyundai Motor Company, Seoul (KR); Kia Motors Corporation, Seoul (KR)

(72) Inventor: Gene Back Hahn, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/003,780

(22) Filed: Aug. 26, 2020

(65) Prior Publication Data

US 2021/0068189 A1    Mar. 4, 2021

Related U.S. Application Data

(60) Provisional application No. 62/894,169, filed on Aug. 30, 2019.

(30) Foreign Application Priority Data

Jun. 29, 2020  (KR) ........................ 10-2020-0079361

(51) Int. Cl.
*H04W 76/19* (2018.01)
*H04W 76/28* (2018.01)
*H04L 1/18* (2023.01)
*H04W 76/36* (2018.01)
*H04L 1/1812* (2023.01)

(52) U.S. Cl.
CPC .......... *H04W 76/19* (2018.02); *H04L 1/1812* (2013.01); *H04W 76/28* (2018.02); *H04W 76/36* (2018.02)

(58) Field of Classification Search
None
See application file for complete search history.

(56) References Cited

U.S. PATENT DOCUMENTS

2020/0304969 A1* 9/2020 Basu Mallick ....... H04L 1/1819
2020/0351707 A1* 11/2020 Cheng .................. H04L 1/1825
2021/0045178 A1* 2/2021 Kung ................ H04W 72/1257
(Continued)

FOREIGN PATENT DOCUMENTS

WO  2020167773 A1  8/2020
WO  2020198586 A1  10/2020

OTHER PUBLICATIONS

Catt (May 13-17, 2019) "RLM / RLF Declaration in NR V2X Sidelink", R2-1905811, 3GPP TSG-RAN WG2 Meeting #106, 3 pages.
(Continued)

*Primary Examiner* — Marcus Smith
(74) *Attorney, Agent, or Firm* — Fox Rothschild LLP

(57) ABSTRACT

An operation method of a first terminal, in a communication system supporting sidelink communication, may include transmitting one or more sidelink data to a second terminal; performing a monitoring operation to receive one or more hybrid automatic repeat request (HARQ) responses for the one or more sidelink data from the second terminal; and declaring a radio link failure (RLF) for a radio link between the first terminal and the second terminal when the one or more HARQ responses indicate a discontinuous transmission (DTX).

11 Claims, 8 Drawing Sheets

(56) References Cited

U.S. PATENT DOCUMENTS

2021/0068187 A1* 3/2021 Baghel ................ H04W 76/23

OTHER PUBLICATIONS

Huawei et al. (Aug. 26-30, 2019) "Considerations on RLM for NR V2X Unicast", R2-1911074, 3GPP TSG-RAN WG2 Meeting#107, 5 pages.
Huawei et al. (Aug. 26-30, 2019) "Sidelink Physical Layer Procedures for NR V2X", R1-1908040, 3GPP TSG RAN WG1 Meeting #98, 25 pages.
Interdigital Inc. (May 13-17, 2019) "RLM/RLF for NR V2X", R2-1906387, 3GPP RAN WG2 Meeting #106, 3 pages.
Extended European Search Report for EP Application No. 20193088.0, dated Jan. 25, 2021, 11 pages.

* cited by examiner

METHOD AND APPARATUS FOR RADIO LINK MANAGEMENT IN SIDELINK COMMUNICATION

CROSS-REFERENCE TO RELATED APPLICATIONS

This application claims the benefit of U.S. Provisional Patent Application No. 62/894,169, filed on Aug. 30, 2019 with the U.S. Patent and Trademark Office, and Korean Patent Application No. 10-2020-0079361, filed on Jun. 29, 2020 in the Korean Intellectual Property Office (KIPO), the entire contents of which are incorporated herein by reference.

BACKGROUND

1. Technical Field

The present disclosure relates generally to sidelink communication technology, more particularly, to a technique for detecting a radio link failure (RLF) for a sidelink.

2. Description of the Related Art

Various systems have been developed for processing of wireless data such as a fourth-generation (4G) communication system (e.g., Long Term Evolution (LTE) communication system or LTE-Advanced (LTE-A) communication system) and a fifth-generation (5G) communication system (e.g., New Radio (NR) communication system), which uses a frequency band higher than that of the 4G communication system. The 5G communication system supports Enhanced Mobile Broadband (eMBB) communications, Ultra-Reliable and Low-Latency communications (URLLC), massive Machine Type Communications (mMTC), and the like.

The 4G communication system and 5G communication system support Vehicle-to-Everything (V2X) communications. The V2X communications supported in a cellular communication system, such as the 4G communication system, the 5G communication system, and the like, may be referred to as 'Cellular-V2X (C-V2X) communications.' The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication system, the V2X communications (e.g., C-V2X communications) may be performed based on 'sidelink' communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. The sidelink communication can be performed by using configured grant (CG) resources. The CG resources may be configured periodically, and periodic data (e.g., periodic sidelink data) can be transmitted using the CG resources.

On the other hand, in the sidelink communication, a radio link failure (RLF) may occur according to a state of a radio link, a change in a distance between terminals, etc., and RLF detection methods considering characteristics of the sidelink communication are needed. In addition, when the RLF occurs, methods for recovering the radio link for the sidelink communication are needed.

SUMMARY

Accordingly, exemplary embodiments of the present disclosure provide a method and an apparatus for detecting a radio link failure (RLF) in sidelink communication.

According to the exemplary embodiments of the present disclosure, an operation method of a first terminal in a communication system supporting sidelink communication may include transmitting one or more sidelink data to a second terminal; performing a monitoring operation to receive one or more hybrid automatic repeat request (HARQ) responses for the one or more sidelink data from the second terminal; and declaring a radio link failure (RLF) for a radio link between the first terminal and the second terminal when the one or more HARQ responses indicate a discontinuous transmission (DTX).

The one or more sidelink data may be transmitted to the second terminal through semi-persistent scheduling (SPS) resources, configured grant (CG) resources, or resources scheduled by sidelink control information (SCI).

The RLF may be declared when a number of the one or more HARQ responses indicating the DTX is greater than or equal to a preset threshold.

The RLF may be declared when the one or more HARQ responses indicating the DTX are received within a predetermined time period.

The RLF may be declared when the one or more HARQ responses received within a predetermined time period indicate the DTX and a number of the one or more HARQ responses indicating the DTX is greater than or equal to a preset threshold.

The one or more HARQ responses may be determined to indicate the DTX when the one or more HARQ responses are negative acknowledgment (NACK) and the NACK is set to indicate the DTX.

The operation method may further include receiving, from a base station, configuration information including one or more information elements used to declare the RLF.

The operation method may further include transmitting, to a base station, information indicating that the RLF is declared.

The operation method may further include, when the RLF is declared, performing an operation of releasing sidelink resources configured for the radio link.

Furthermore, according to the exemplary embodiments of the present disclosure, an operation method of a first terminal in a communication system supporting sidelink communication may include transmitting one or more sidelink data to a second terminal; performing a monitoring operation to receive one or more hybrid automatic repeat request (HARQ) responses for the one or more sidelink data from the second terminal; and declaring a radio link failure (RLF) for a radio link between the first terminal and the second terminal when the one or more HARQ responses are not received.

The RLF may be declared when a number of the one or more HARQ responses that are not received by the first terminal is equal to or greater than a preset threshold.

The one or more HARQ responses may be consecutive HARQ responses.

The RLF may be declared when a number of the one or more HARQ responses that are not received by the first terminal within a predetermined time period is equal to or greater than a preset threshold.

The operation method may further include receiving, from a base station, configuration information including one or more information elements used to declare the RLF.

The configuration information may include a preset threshold that is a comparison criterion of a number of the one or more HARQ responses.

The operation method may further include transmitting, to a base station, information indicating that the RLF is declared.

The operation method may further include, when the RLF is declared, performing an operation of releasing sidelink resources configured for the radio link.

Furthermore, according to the exemplary embodiments of the present disclosure, an operation method of a base station in a communication system supporting sidelink communication may include transmitting configuration information including one or more information elements used to declare a radio link failure (RLF) for a sidelink to one or more terminals; receiving information indicating that an RLF is declared from a first terminal among the one or more terminals; and releasing a sidelink resource configured for a radio link associated with the RLF.

The operation method may further include reconfiguring the sidelink resource for the radio link; and transmitting configuration information of the reconfigured sidelink resource to the first terminal.

The configuration information may include information indicating a number of RLF-hybrid automatic repeat request (RLF-HARQ) responses, and the RLF may be declared at the first terminal when the first terminal receives at least one HARQ response indicating a discontinuous transmission (DTX) and a number of the at least one HARQ response is equal to or greater than the number of RLF-HARQ responses.

The configuration information may include information indicating an RLF period, and when the first terminal receives an HARQ response indicating a DTX within the RLF period, the RLF may be declared at the first terminal.

The configuration information may include information indicating a channel busy ratio (RLF-CBR) threshold, and when a CBR measured at the first terminal is equal to or greater than the RLF-CBR threshold, the RLF may be declared at the first terminal.

According to the exemplary embodiments of the present disclosure, the base station may transmit RLF-related parameter(s) to the terminal, and the terminal may determine whether an RLF occurs for a sidelink based on the RLF-related parameter(s). When the RLF is declared, the sidelink resources configured for the radio link associated with the corresponding RLF may be released, and the sidelink resources for the radio link may be reconfigured. Accordingly, the RLF detection procedure for the sidelink can be efficiently performed in the communication system, and the release and/or reconfiguration procedure of the sidelink resources can be efficiently performed according to the RLF detection. That is, the performance of the communication system supporting sidelink communication can be improved.

BRIEF DESCRIPTION OF DRAWINGS

Exemplary embodiments of the present disclosure will become more apparent by describing in detail exemplary embodiments of the present disclosure with reference to the accompanying drawings, in which.

Figure 1:
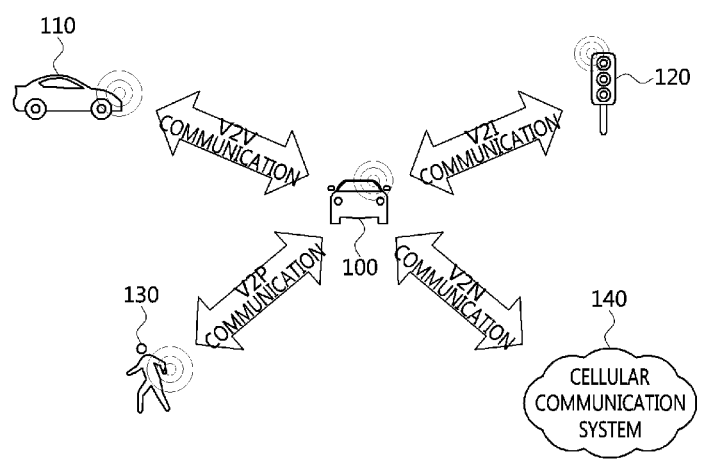
FIG. 1 is a conceptual diagram illustrating V2X communication scenarios according to an exemplary embodiment of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Exemplary embodiments of the present disclosure are disclosed herein. However, specific structural and functional details disclosed herein are merely representative for purposes of describing exemplary embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Additionally, it is understood that one or more of the below methods, or aspects thereof, may be executed by at least one control unit. The term "control unit" or "controller" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) including the control unit in conjunction with one or more other components, as would be appreciated by a person of ordinary skill in the art.

Hereinafter, exemplary embodiments of the present disclosure will be described in greater detail with reference to the accompanying drawings. To facilitate general understanding in describing the present disclosure, the same components in the drawings are denoted with the same reference signs, and repeated description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located within the vehicle 100 (e.g., the first vehicle)) and a second vehicle 110 (e.g., a communication node located within the vehicle 110 (e.g., the second vehicle)). Various driving information such as velocity, heading, time, position, and the like may be exchanged between the vehicles 100 and 110 via the V2V communications. For example, autonomous driving (e.g., platooning) may be supported based on the driving information exchanged via the V2V communications. The V2V communications supported in the cellular communication system 140 may be performed based on "sidelink" communication technologies (e.g., proximity based service (ProSe) and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 via the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node located within the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node located within the vehicle 100 or the communication node carried by the person 130 may be configured to generate an alarm that indicates a danger by detecting a dangerous situation based on the obtained driving information and movement information. The V2P communications supported in the cellular communication system 140 may be performed based on sidelink communication technologies (e.g., ProSe and D2D communication technologies, and the like). In particular, the communications between the communication node located within the vehicle 100 and the communication node carried by the person 130 may be performed using at least one sidelink channel established between the communication nodes.

The V2N communications may be communications between the first vehicle 100 (e.g., the communication node located in the vehicle 100) and a server connected via the cellular communication system 140. The V2N communications may be performed based on the 4G communication technology (e.g., LTE or LTE-A) or the 5G communication technology (e.g., NR). In addition, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
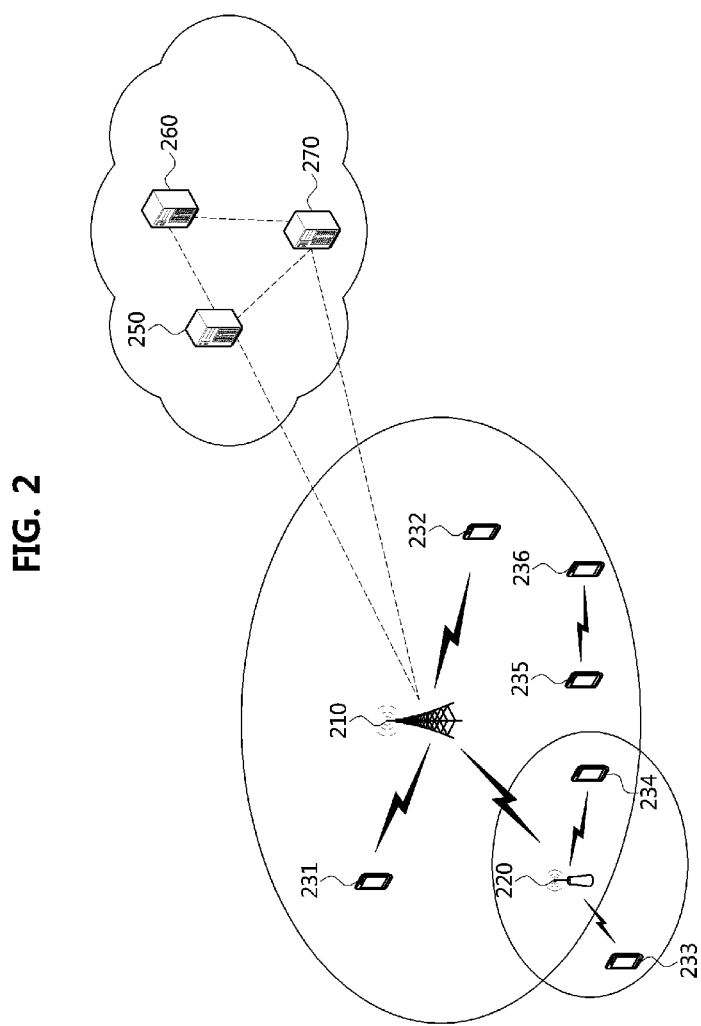
FIG. 2 is a conceptual diagram illustrating a cellular communication system according to an exemplary embodiment of the present disclosure.

FIG. 2 is a conceptual diagram illustrating exemplary embodiments of a cellular communication system. As shown in FIG. 2, a cellular communication system may include an access network, a core network, and the like. The access network may include a base station 210, a relay 220, User Equipment (UEs) 231 through 236, and the like. The UEs 231 through 236 may include communication nodes located within the vehicles 100 and 110 of FIG. 1, the communication node located within the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Additionally, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) including the cellular communication system may be configured to perform communications using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) including the cellular communication system may be configured as follows.

Figure 3:
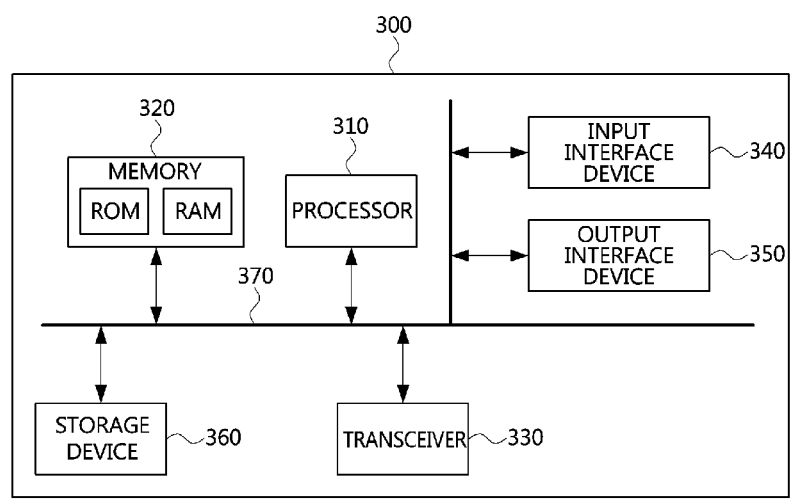
FIG. 3 is a conceptual diagram illustrating a communication node constituting a cellular communication system according to an exemplary embodiment of the present disclosure.

FIG. 3 is a conceptual diagram illustrating exemplary embodiments of a communication node constituting a cellular communication system. As shown in FIG. 3, a communication node 300 may include at least one processor 310, a memory 320, and a transceiver 330 connected to a network for performing communications. Additionally, the communication node 300 may further include an input interface device 340, an output interface device 350, a storage device 360, and the like. Each component included in the communication node 300 may be configured to communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may be configured to execute at least one instruction stored in at least one of the memory 320 and the storage device 360. The processor 310 may refer to a central processing unit (CPU), a graphics processing unit (GPU), or a dedicated processor on which methods in accordance with exemplary embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may be configured to transmit signals received from the core network to the UEs 231 through 236 and the relay 220, and transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may be configured to communicate with the base station 210 after being connected to the base station 210.

The relay 220 may be connected to the base station 210 and may relay communications between the base station 210 and the UEs 233 and 234. In other words, the relay 220 may be configured to transmit signals received from the base station 210 to the UEs 233 and 234, and transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be disposed outside the cell coverage of the base station 210. The UEs 233 and 234 may be connected to the relay 220 by performing a connection establishment procedure with the relay 220. The UEs 233 and 234 may be configured to communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may be configured to perform operations that correspond to the relays 220 and operations supported by the relays 220.

Particularly, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located within the first vehicle 100 of FIG. 1 and the UE 236 may be the communication node located within the second vehicle 110 of FIG. 1. When V2I communications are performed using the sidelink communication technique, the UE 235 may be the communication node located within first vehicle 100 of FIG. 1 and the UE 236 may be the communication node located within the infrastructure 120 of FIG. 1. When V2P communications are performed using the sidelink communication technique, the UE 235 may be the communication node located within first vehicle 100 of FIG. 1 and the UE 236 may be the communication node carried by the person 130 of FIG. 1.

The scenarios to which the sidelink communications are applied may be classified as shown below in Table 1 based on the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
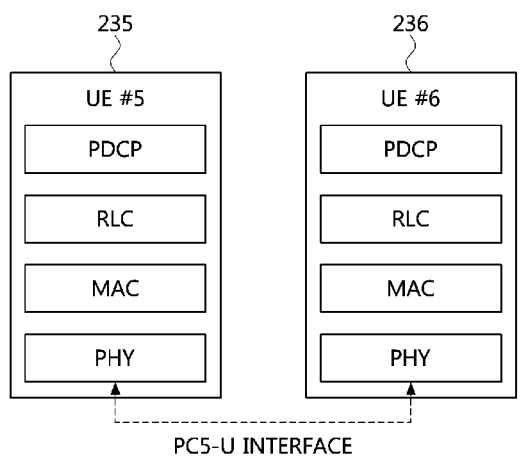
FIG. 4 is a block diagram illustrating a user plane protocol stack of a UE performing sidelink communication according to an exemplary embodiment of the present disclosure.

FIG. 4 is a block diagram illustrating exemplary embodiments of a user plane protocol stack of a UE performing sidelink communication. As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Additionally, in the sidelink communications, a hybrid automatic repeat request (HARQ) feedback operation may be supported, and an RLC acknowledged mode (RLC AM) or an RLC unacknowledged mode (RLC UM) may be supported. Meanwhile, a control plane protocol stack of the UEs (e.g., the UEs 235 and 236) performing sidelink communications may be configured as follows.

Figure 5:
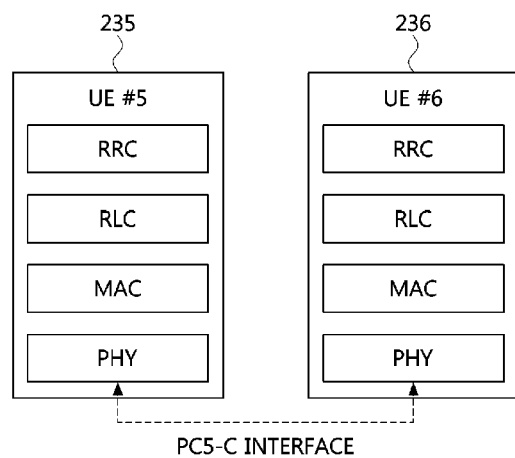
FIG. 5 is a block diagram illustrating a control plane protocol stack of a UE performing sidelink communication according to an exemplary embodiment of the present disclosure.
Figure 6:
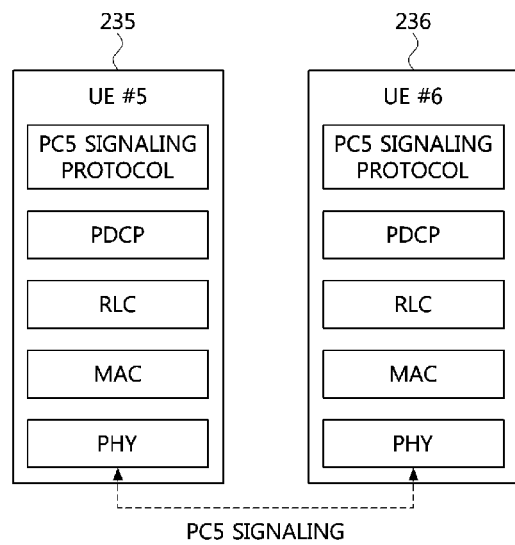
FIG. 6 is a block diagram illustrating a control plane protocol stack of a UE performing sidelink communication according to an exemplary embodiment of the present disclosure.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication. As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). In addition, a demodulation reference signal (DM-RS), a synchronization signal, or the like may be used in the sidelink communications between the UEs 235 and 236. Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may be configured to perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure, etc.). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. Particularly, the sidelink control information may be transmitted via resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In particular, the sidelink control information may be transmitted via resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received via resources scheduled by the base station 210. When the sidelink TM 4 is supported, the resource pool for transmitting and receiving sidelink data may be configured by a dedicated RRC signaling procedure or a broadcast RRC signaling procedure. Particularly, the sidelink data may be transmitted and received via resources selected autonomously by the UE (e.g., UE 235 or 236) within the resource pool configured by the dedicated RRC signaling procedure or the broadcast RRC signaling procedure.

Hereinafter, methods for detecting a radio link failure (RLF) and methods for recovering a radio link in the sidelink communication will be described. Even when a method (e.g., transmission or reception of a signal) to be performed at a first communication node among communication nodes is described, a corresponding second communication node may be configured to perform a method (e.g., reception or transmission of the signal) corresponding to the method performed at the first communication node. In other words, when an operation of a first vehicle is described, a corresponding second vehicle may be configured to perform an operation that corresponds to the operation of the first vehicle. Conversely, when an operation of the second vehicle is described, the corresponding first vehicle may be configured to perform an operation that corresponds to the operation of the second vehicle. In the exemplary embodiments described below, the operation of the vehicle may be the operation of the communication node located in the vehicle.

In the exemplary embodiments, an HARQ response may be ACK, NACK, and/or discontinuous transmission (DTX). The exemplary embodiments applied when the HARQ response is ACK may also be applied even when the HARQ response is NACK or DTX. The exemplary embodiments applied even when the HARQ response is NACK may also be applied when the HARQ response is ACK or DTX. The exemplary embodiments applied when the HARQ response is DTX may be applied even when the HARQ response is ACK or NACK.

The sidelink signal may be a synchronization signal and a reference signal used for sidelink communication. For example, the synchronization signal may be a synchronization signal/physical broadcast channel (SS/PBCH) block, a sidelink synchronization signal (SLSS), a primary sidelink synchronization signal (PSSS), a secondary sidelink synchronization signal (SSSS), or the like. The reference signal may be a channel state information-reference signal (CSI-RS), a DM-RS, a phase tracking-reference signal (PT-RS), a cell-specific reference signal (CRS), a sounding reference signal (SRS), a discovery reference signal (DRS), or the like.

The sidelink channel may be a PSSCH, PSCCH, PSDCH, PSBCH, physical sidelink feedback channel (PSFCH), or the like. Further, the sidelink channel may mean a sidelink channel including a sidelink signal mapped to specific resources within the sidelink channel. Sidelink communication may support a broadcast service, a multicast service, a groupcast service, and a unicast service.

In a cellular communication system, a terminal may perform a radio link monitoring (RLM) operation to check a state of a radio link (e.g., Uu interface) between the terminal and a base station. The terminal may detect (e.g., declare) an RLF based on a result of the RLM operation. For example, a lower layer (e.g., entity performing a lower layer function) of the terminal may transmit an out-of-synch (OSS) indicator to a higher layer (e.g., entity performing a higher layer function) of the terminal according to a result of the RLM operation. Here, the lower layer may be a physical (PHY) layer, and the higher layer may be an RRC layer.

When the number of OSS indicators received from the lower layer of the terminal is greater than or equal to a preset number (e.g., N310 defined in the technical specification), the higher layer of the terminal may start a T310 timer. When the state of the radio link does not improve until the T310 timer expires (e.g., when continuous in-synch (IS) indicators less than a preset number (e.g., N311 defined in the technical specification) are received until the T310 timer expires), the terminal (e.g., the higher layer of the terminal) may declare an RLF.

When the RLF is declared (i.e., when the RLF occurs), an RRC re-establishment procedure may be performed. The terminal may search for a new cell, and may attempt to establish an RRC connection to a new cell by performing the RRC re-establishment procedure. When the RRC re-establishment procedure is successfully completed, the radio link between the terminal and the base station may be recovered. On the other hand, when the RRC re-establishment procedure fails, the operation state of the terminal may transition from the RRC connected state to the RRC idle state. That is, the RRC connection between the terminal and the base station may be released. In order to resume communication in this state, a new RRC connection should be established between the terminal and the base station.

Meanwhile, in the communication system supporting sidelink communication (e.g., V2X communication), a transmitting terminal and/or a receiving terminal may perform RLM operation (e.g., operation for RLF detection) to detect (e.g., declare) an RLF. The RLF detection method (e.g., RLF declaration method) and the radio link recovery method for sidelink communication may be performed as follows.

Figure 7:
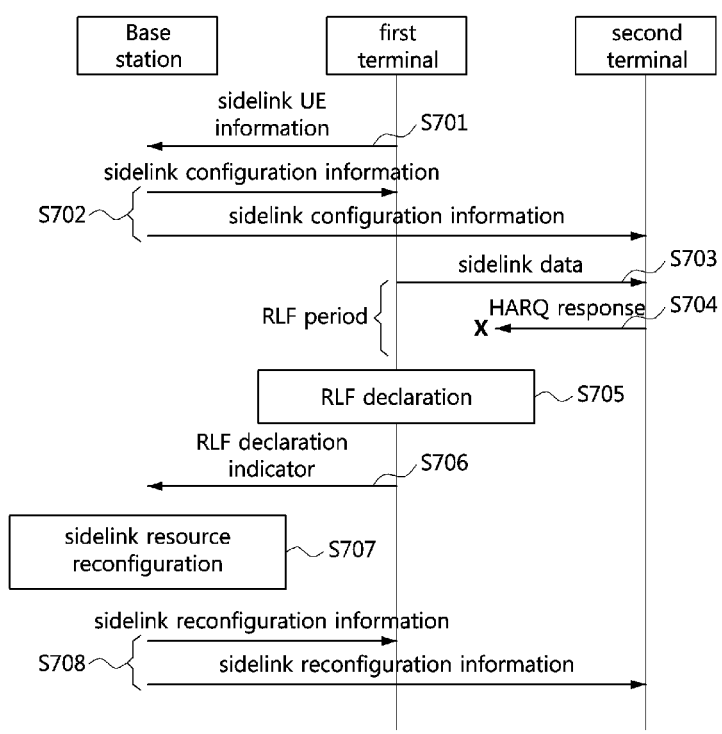
FIG. 7 is a sequence chart illustrating a first exemplary embodiment of a method for RLF detection and radio link recovery in a communication system supporting sidelink communication.

FIG. 7 is a sequence chart illustrating a first exemplary embodiment of a method for RLF detection and radio link recovery in a communication system supporting sidelink communication. As shown in FIG. 7, a communication system may include a base station, a first terminal, and a second terminal. The base station may be the base station 210 shown in FIG. 2. The first terminal may be the UE 235 shown in FIG. 2, and the second terminal may be the UE 236 shown in FIG. 2. Alternatively, the first terminal may be the UE 236 shown in FIG. 2, and the second terminal may be the UE 235 shown in FIG. 2. Each of the first terminal and the second terminal may be located in a vehicle. The base station, the first terminal, and the second terminal may be configured identically or similarly to the communication node 300 shown in FIG. 3. The first terminal and the second terminal may support the protocol stacks shown in FIGS. 4 to 6. The first terminal and the second terminal may be connected to the base station, and may perform sidelink communication based on scheduling of the base station. Alternatively, the first terminal and the second terminal may be located outside the coverage of the base station, and may perform sidelink communication without scheduling of the base station.

The first terminal may transmit sidelink UE information to the base station to initiate sidelink communication (e.g., V2X communication) (S701). The sidelink UE information may include capability information of the first terminal. For example, the sidelink UE information may include information indicating that sidelink communication is initiated. The base station may receive the sidelink UE information from the first terminal and may identify information element(s) included in the sidelink UE information. In addition, when the sidelink UE information is received from the first terminal, the base station may determine that the first terminal initiates sidelink communication. The base station may generate configuration information (hereinafter referred to as 'sidelink configuration information') for sidelink communication, and may transmit the sidelink configuration information (S702). The sidelink configuration information may be transmitted when the sidelink UE information (e.g., sidelink UE information including the information indicating that sidelink communication is initiated) is received from the first terminal. Alternatively, the sidelink configuration information may be transmitted regardless of the reception of the sidelink UE information. In this case, the step S701 may be omitted.

The sidelink configuration information may be transmitted through a combination of one or more among system information (e.g., master information block (MIB), system information block (SIB)), an RRC message (e.g., cell-specific RRC message, UE-specific RRC message, RRC reconfiguration message, etc.), a MAC message (e.g. MAC control element (CE)), and a PHY message (e.g. downlink control information (DCI)). For example, the sidelink configuration information may be transmitted through only an RRC message. Alternatively, some of the information element(s) included in the sidelink configuration information may be transmitted through an RRC message, and the other information element(s) included in the sidelink configuration information may be transmitted through a MAC message and/or a PHY message. The sidelink configuration information may include one or more information elements described in Table 3 below.

TABLE 3

| Information elements | Description |
|---|---|
| RLF period | The RLF period may be a reference value used by a terminal to detect (e.g., declare) an RLF. The terminal may declare an RLF when an HARQ response (e.g., ACK or NACK) is not received from another terminal within the RLF period. Alternatively, the terminal may declare an RLF when a DTX (e.g., information or HARQ response indicating DTX) is received from another terminal within the RLF period. In this case, the RLF period may start at a transmission time (e.g., transmission starting time or transmission ending time) of a PSCCH (e.g., SCI or $1^{st}$ stage SCI) or a PSSCH (e.g., data or $2^{nd}$ stage SCI). Alternatively, the terminal may perform a CBR measurement in the RLF period, and declare an RLF when the measured CBR is equal to or greater than an RLF-CBR threshold. The RLF period may be configured in units of symbol(s), slot(s), or subframe(s). Alternatively, the RLF period may be configured in units of an absolute time unit (e.g., millisecond)). |

TABLE 3-continued

| Information elements | Description |
|---|---|
| Number of RLF-HARQ | The number of RLF-HARQ responses may be a reference value used by a terminal to detect (e.g., declare) an RLF. The number of RLF-HARQ responses may be an integer equal to or greater than 1. The terminal may declare an RLF when the number of NACKs or DTXs (e.g., information or HARQ response responses indicating DTX) received from another terminal is equal to or greater than the number of RLF-HARQ responses. Particularly, the terminal may compare the number of consecutive NACKs or consecutive DTXs with the number of RLF-HARQ responses. |
| RLF-channel busy ratio (CBR) threshold | The RLF-CBR threshold may be a reference value used by a terminal to detect (e.g., declare) an RLF. The terminal may measure a channel (e.g., radio link) between itself and another terminal, and declare an RLF when a measured CBR is equal to or greater than the RLF-CBR threshold. |
| DTX-NACK indicator NACK | The DTX-NACK indicator may indicate whether to transmit (e.g., NACK indicating occurrence of a DTX situation) when a DTX situation (e.g., situation in which data is not received) occurs. The DTX-NACK indicator set to '0' may indicate that NACK is not transmitted when a DTX situation occurs. The DTX-NACK indicator set to '1' may indicate that NACK is transmitted when a DTX situation occurs. |

The sidelink configuration information may include RLF-related parameter(s). In addition, the sidelink configuration information may further include information element(s) required for sidelink communication as well as the RLF-related parameter(s). For example, the information element(s) required for sidelink communication may include configuration information of a bandwidth part for sidelink, configuration information of a resource pool, configuration information of semi-persistent scheduling for sidelink, and/or configuration information of a configured grant (CG) for sidelink.

The terminal(s) (e.g., the first terminal and/or the second terminal) may receive the sidelink configuration information from the base station, and identify the information element(s) included in the sidelink configuration information. When the first terminal is located within the coverage of the base station, and the second terminal is located outside the coverage of the base station, the first terminal may receive the sidelink configuration information from the base station, but the second terminal may not receive the sidelink configuration information from the base station. In this case, the first terminal may transmit a MAC message and/or a PHY message (e.g., SCI, $1^{st}$ stage SCI, $2^{nd}$ stage SCI) including the sidelink configuration information to the second terminal. The second terminal may receive the MAC message and/or the PHY message from the first terminal, and identify the sidelink configuration information included in the MAC message and/or the PHY message. Alternatively, the sidelink configuration information may be predefined in the technical specification. In this case, since the communication nodes (e.g., the base station, the first terminal, and the second terminal) already know the sidelink configuration information, the step S702 may be omitted.

Meanwhile, the first terminal may transmit sidelink data to the second terminal through a PSSCH (S703). The resource (e.g., PSSCH) through which the sidelink data is transmitted may be an SPS resource, a CG resource, or a resource scheduled by an SCI. Each of the SPS resource and the CG resource may be preconfigured by the base station, and configuration information of each of the SPS resource and the CG resource may be included in the sidelink configuration information of the step S702. When the sidelink data is transmitted through the resource scheduled by the SCI, the first terminal may transmit the SCI including scheduling information to the second terminal before the step S703. The step S703 may be performed based on the scheduling information included in the SCI.

The second terminal may perform a monitoring operation to receive the sidelink data. When the sidelink data is successfully received, the second terminal may transmit HARQ acknowledgment (ACK) to the first terminal in response to the sidelink data (S704). When a decoding operation of the sidelink data fails, the second terminal may transmit HARQ NACK to the first terminal in response to the sidelink data (S704). When no sidelink data is detected in the SPS resource, the CG resource, or the resource scheduled by the SCI, the second terminal may not transmit HARQ ACK or HACK NACK to the first terminal, or transmit a discontinuous transmission (DTX) (e.g., HARQ DTX) to the first terminal. In this case, the second terminal may determine that a DTX situation (e.g., a situation in which the sidelink data is not detected in the SPS resource, the CG resource, or the resource scheduled by the SCI) occurs.

When the sidelink configuration information includes an RLF period or when the RLF period is defined in the technical specification, the first terminal may perform a monitoring operation to receive an HARQ response (e.g., HARQ feedback) within the RLF period. The RLF period may start from a transmission time (e.g., a transmission starting time or a transmission ending time) of the SCI scheduling the sidelink data of the step S703. Alternatively, the RLF period may start from a transmission time (e.g., a transmission starting time or a transmission ending time) of the sidelink data of the step S703.

When an HARQ response (e.g., ACK or NACK) for the sidelink data is received from the second terminal within the RLF period, the first terminal may determine that no RLF has occurred. Even when the second terminal transmits the HARQ response, if a channel state between the first terminal and the second terminal is not good or if a distance between the first terminal and the second terminal increases, the first terminal may not receive the HARQ response from the second terminal. Alternatively, the second terminal may not transmit the HARQ response when a DTX situation occurs, and in this case, the first terminal may not receive the HARQ response from the second terminal.

When the HARQ response (e.g., ACK or NACK) for the sidelink data is not received from the second terminal within the RLF period (e.g., when the HARQ response is absent), the first terminal may determine that an RLF has occurred (S705). Alternatively, when a DTX for the sidelink data is received from the second terminal within the RLF period, the first terminal may determine that an RLF has occurred (S705). In this case, the first terminal may declare the RLF. For example, when the HARQ response (e.g., ACK or NACK) for the sidelink data is not received from the second terminal within the RLF period or when a DTX for the sidelink data is received from the second terminal within the RLF period, the lower layer (e.g., entity performing the PHY layer function) of the first terminal may transmit an RLF indicator (or, OSS indicator) to the higher layer (e.g., entity performing the RRC layer function) of the first terminal. When the RLF indicator is received from the lower layer of the first terminal, the higher layer of the first terminal may declare the RLF. When the RLF is declared, the first terminal may release sidelink resources between the first terminal and the second terminal. For example, the first terminal (e.g., the higher layer of the first terminal) may release the PC5 interface (e.g., PC5 connection).

When the RLF is declared (e.g., when the RLF is detected), the first terminal may transmit information indicating that the RLF is declared (hereinafter, referred to as 'RLF declaration indicator') to the base station (S706). The RLF declaration indicator may be transmitted to the base station through an RRC message, a MAC message, or a PHY message (e.g., uplink control information (UCI)). For example, the RLF declaration indicator may be included in sidelink UE information or UE assistance information, and the sidelink UE information or the UE assistance information may be transmitted from the first terminal to the base station. The RLF declaration indicator may be information requesting release of the sidelink resources configured in the first terminal as well as information indicating that the first terminal has declared the RLF. Alternatively, in the step S706, the information requesting release of the sidelink resources configured in the first terminal (hereinafter, referred to as 'resource release indicator') may be transmitted together with the RLF declaration indicator. The step S706 may be performed when the sidelink TM 1 or 3 shown in Table 2 is used (e.g., when sidelink resources are allocated by the base station). When the sidelink TM 2 or 4 described in Table 2 is used (e.g., when the first terminal autonomously selects the sidelink resources), the step S706 may not be performed.

The base station may receive the RLF declaration indicator or may receive the RLF declaration indicator and the resource release indicator from the first terminal. In this case, the base station may determine that the first terminal has declared the RLF. In addition, the base station may release the sidelink resources configured in the terminal(s) (e.g., the first terminal and/or the second terminal). The base station may allocate the released sidelink resources to another terminal (e.g., a third terminal). In this case, the released sidelink resources may be used for sidelink communication of another terminal (e.g., the third terminal) until the radio link between the first terminal and the second terminal is recovered.

In addition, the base station may reconfigure the sidelink resources (e.g., bandwidth part, resource pool, SPS resource, CG resource) for the first terminal (S707). Sidelink reconfiguration information including reconfiguration information of the sidelink resources may be transmitted to the terminal(s) (e.g., the first terminal and/or the second terminal) (S708). The sidelink reconfiguration information may be transmitted to the terminal(s) (e.g., the first terminal and/or the second terminal) through a combination of one or more among system information, an RRC message, a MAC message, and a PHY message.

On the other hand, when the RLF is declared, the first terminal may perform a recovery procedure of the radio link between the first terminal and the second terminal. For example, the first terminal may transmit a sidelink signal by using a different sidelink resource (e.g., a sidelink resource belonging to a different bandwidth part, a sidelink resource belonging to a different resource pool, another SPS resource, another CG resource, candidate sidelink resource) from the sidelink resource used in the step S703. Here, the sidelink signal may be a discovery signal, an SCI (e.g., SCI including scheduling information of initial transmission or retransmission sidelink data), and/or sidelink data (e.g., initial transmission or retransmission sidelink data). When a response (e.g., discovery response signal, HARQ response) to the sidelink signal is received from the second terminal, the first terminal may determine that the radio link between the first terminal and the second terminal has been recovered. Alternatively, when the response (e.g., discovery response signal, HARQ response) to the sidelink signal is not received from the second terminal, the first terminal may determine that the recovery procedure of the radio link between the first terminal and the second terminal has failed. In an exemplary embodiment, when the HARQ response is not received from the second terminal within the RLF period and the radio link recovery procedure fails, the first terminal may declare the RLF. Alternatively, when a DTX is received from the second terminal within the RLF period, and the radio link recovery procedure fails, the first terminal may declare the RLF. That is, the step S705 may be performed after performing the recovery procedure of the radio link.

Figure 8:
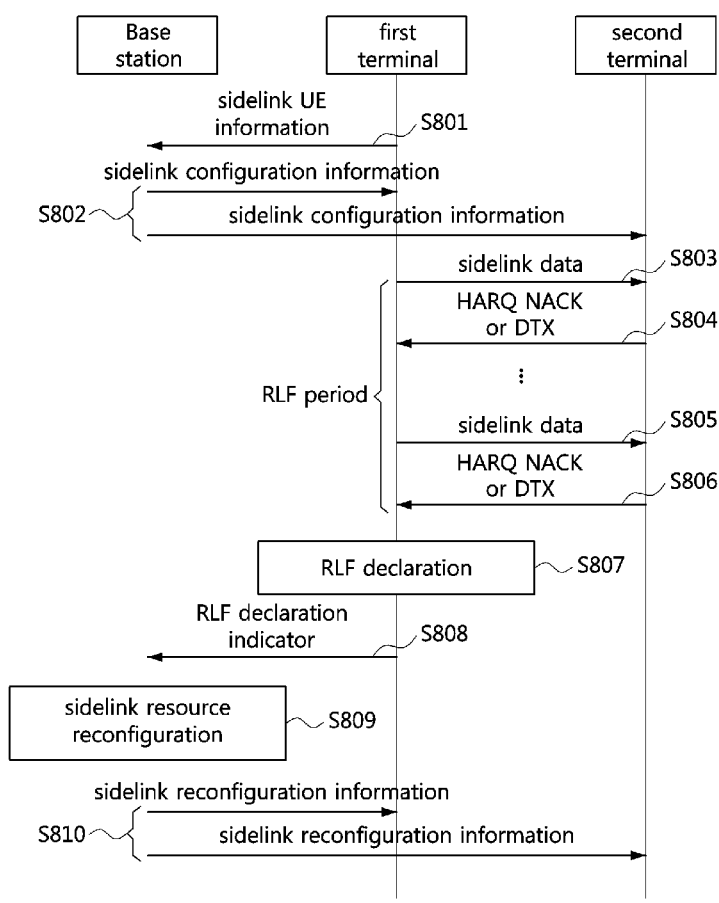
FIG. 8 is a sequence chart illustrating a second exemplary embodiment of a method for RLF detection and radio link recovery in a communication system supporting sidelink communication.

FIG. 8 is a sequence chart illustrating a second exemplary embodiment of a method for RLF detection and radio link recovery in a communication system supporting sidelink communication. As shown in FIG. 8, a communication system may include a base station, a first terminal, and a second terminal. The base station may be the base station 210 shown in FIG. 2. The first terminal may be the UE 235 shown in FIG. 2, and the second terminal may be the UE 236 shown in FIG. 2. Alternatively, the first terminal may be the UE 236 shown in FIG. 2, and the second terminal may be the UE 235 shown in FIG. 2. Each of the first terminal and the second terminal may be located in a vehicle. The base station, the first terminal, and the second terminal may be configured identically or similarly to the communication node 300 shown in FIG. 3. The first terminal and the second terminal may support the protocol stacks shown in FIGS. 4 to 6. The first terminal and the second terminal may be connected to the base station, and may perform sidelink communication based on scheduling of the base station. Alternatively, the first terminal and the second terminal may be located outside the coverage of the base station, and may perform sidelink communication without scheduling of the base station.

The first terminal may transmit sidelink UE information to the base station to initiate sidelink communication (e.g., V2X communication) (S801). The sidelink UE information may include capability information of the first terminal. For example, the sidelink UE information may include information indicating that sidelink communication is initiated. The base station may receive the sidelink UE information from the first terminal and may identify information element(s) included in the sidelink UE information. In addition, when the sidelink UE information is received from the first terminal, the base station may determine that the first terminal initiates sidelink communication. The base station may generate sidelink configuration information, and may transmit the sidelink configuration information (S802). The sidelink configuration information may be transmitted when the sidelink UE information (e.g., sidelink UE information including the information indicating that sidelink communication is initiated) is received from the first terminal. Alternatively, the sidelink configuration information may be transmitted regardless of reception of the sidelink UE information. In this case, the step S801 may be omitted.

The sidelink configuration information may be transmitted through a combination of one or more among system information, an RRC message (e.g., RRC reconfiguration message, etc.), a MAC message, and a PHY message. For example, the sidelink configuration information may be transmitted through only an RRC message. Alternatively, some of the information element(s) included in the sidelink configuration information may be transmitted through an RRC message, and the other information element(s) included in the sidelink configuration information may be transmitted through a MAC message and/or a PHY message. The sidelink configuration information may include one or more information elements described in Table 3 below.

That is, the sidelink configuration information may include RLF-related parameter(s). In addition, the sidelink configuration information may further include information element(s) required for sidelink communication as well as the RLF-related parameter(s). For example, the information element(s) required for sidelink communication may include configuration information of a bandwidth part for sidelink, configuration information of a resource pool, configuration information of semi-persistent scheduling for sidelink, and/or configuration information of a configured grant (CG) for sidelink.

The terminal(s) (e.g., the first terminal and/or the second terminal) may receive the sidelink configuration information from the base station, and identify the information element(s) included in the sidelink configuration information. When the first terminal is located within the coverage of the base station, and the second terminal is located outside the coverage of the base station, the first terminal may receive the sidelink configuration information from the base station, but the second terminal may not receive the sidelink configuration information from the base station. In this case, the first terminal may transmit a MAC message and/or a PHY message including the sidelink configuration information to the second terminal. The second terminal may receive the MAC message and/or the PHY message from the first terminal, and identify the sidelink configuration information included in the MAC message and/or the PHY message. Alternatively, the sidelink configuration information may be predefined in the technical specification. In this case, since the communication nodes (e.g., the base station, the first terminal, and the second terminal) already know the sidelink configuration information, the step S802 may be omitted.

Meanwhile, the first terminal may transmit sidelink data to the second terminal through a PSSCH (S803). The resource (e.g., PSSCH) through which the sidelink data is transmitted may be an SPS resource, a CG resource, or a resource scheduled by an SCI. Each of the SPS resource and the CG resource may be preconfigured by the base station, and configuration information of each of the SPS resource and the CG resource may be included in the sidelink configuration information of the step S802. When the sidelink data is transmitted through the resource scheduled by the SCI, the first terminal may transmit the SCI including scheduling information to the second terminal before the step S803. The step S803 may be performed based on the scheduling information included in the SCI.

The second terminal may perform a monitoring operation to receive the sidelink data. When a decoding operation of the sidelink data fails, the second terminal may transmit HARQ NACK to the first terminal in response to the sidelink data (S804). When no sidelink data is detected in the SPS resource, the CG resource, or the resource scheduled by the SCI, the second terminal may not transmit HARQ ACK or HACK NACK to the first terminal. In this case, the first terminal may not receive an HARQ response (e.g., HARQ ACK or HARQ NACK) from the second terminal within a predetermined time period. Accordingly, the first terminal may determine that a DTX situation has occurred in the second terminal or that an HARQ DTX has been received from the second terminal. In the exemplary embodiments, the occurrence of the DTX situation or the reception of the HARQ DTX may indicate absence of the HARQ response. Alternatively, when no sidelink data is detected in the SPS resource, the CG resource, or the resource scheduled by the SCI, the second terminal may transmit a DTX to the first terminal (S804).

After the step S803 or S804, the first terminal may transmit one or more sidelink data (e.g., initial transmission or retransmission sidelink data) to the second terminal. For example, in the step S805, the first terminal may transmit the sidelink data to the second terminal through a PSSCH. The resource (e.g., PSSCH) through which sidelink data is transmitted may be an SPS resource, a CG resource, or a resource scheduled by an SCI. Each of the SPS resource and the CG resource may be preconfigured by the base station. When the sidelink data is transmitted through the resource scheduled by the SCI, the first terminal may transmit the SCI including scheduling information to the second terminal before the step S805. The step S805 may be performed based on the scheduling information included in the SCI.

The second terminal may perform a monitoring operation to receive the sidelink data. When a decoding operation of the sidelink data fails, the second terminal may transmit HARQ NACK to the first terminal in response to the sidelink data (S806). When no sidelink data is detected in the SPS resource, the CG resource, or the resource scheduled by the SCI, the second terminal may not transmit HARQ ACK or HACK NACK to the first terminal. In this case, the first terminal may not receive an HARQ response (e.g., HARQ ACK or HARQ NACK) from the second terminal within a predetermined time period. Accordingly, the first terminal may determine that a DTX situation has occurred in the second terminal, that an HARQ DTX is received from the second terminal, or that the HARQ response is absent. Alternatively, when sidelink data is not detected in the SPS resource, the CG resource, or the resource scheduled by the SCI, the second terminal may transmit a DTX to the first terminal (S806).

Meanwhile, the first terminal may receive HARQ NACK and/or DTX from the second terminal, and may determine whether an RLF occurs based on the number of HARQ NACKs or DTXs (e.g., consecutive HARQ NACKs and/or DTXs) received from the second terminal. The first terminal may compare the number of HARQ NACKs or DTXs (e.g., consecutive HARQ NACKs and/or DTXs) received from the second terminal with the number of RLF-HARQ responses included in the sidelink configuration information or the number of RLF-HARQ responses defined in the technical specification. If the number of HARQ NACKs and/or DTXs (e.g., consecutive HARQ NACKs and/or DTXs) received from the second terminal is less than the number of RLF-HARQ responses, the first terminal may determine that no RLF has occurred. On the other hand, if the number of HARQ NACKs and/or DTXs (e.g., consecutive HARQ NACKs and/or DTXs) received from the second terminal is greater than or equal to the number of RLF-HARQ responses, the first terminal may declare the RLF (S807).

As another method for detecting the RLF, the number of RLF-HARQ responses and the RLF period may be considered together. In this case, the first terminal compare the number of HARQ NACKs and/or DTXs (e.g., consecutive HARQ NACKs and/or DTXs) received from the second terminal within the RLF period included in the sidelink configuration information or the RLF period defined in the technical specification with the number of RLF-HARQ responses. If the number of HARQ NACKs and/or DTXs (e.g., consecutive HARQ NACKs and/or DTXs) received from the second terminal within the RLF period is less than the number of RLF-HARQ responses, the first terminal may determine that the RLF has not occurred. On the other hand, when the number of HARQ NACKs and/or DTXs (e.g., consecutive HARQ NACKs and/or DTXs) received from the second terminal within the RLF period is greater than or equal to the number of RLF-HARQ responses, the first terminal may declare the RLF (S807).

The step S807 may be performed as follows. For example, when the number of HARQ NACKs and/or DTXs (e.g., consecutive HARQ NACKs and/or DTXs) received from the second terminal is greater than or equal to the number of RLF-HARQ responses or when the number of HARQ NACKs and/or DTXs (e.g., consecutive HARQ NACKs and/or DTXs) received from the second terminal within the RLF period is equal to or greater than the number of RLF-HARQ responses, the lower layer (e.g., entity performing the PHY layer function) of the first terminal may transmit the RLF indicator (or OSS indicator) to the higher layer (e.g., entity performing the RRC layer function) of the first terminal. When the RLF indicator is received from the lower layer of the first terminal, the higher layer of the first terminal may declare the RLF. When the RLF is declared, the first terminal may release sidelink resources between the first terminal and the second terminal. For example, the first terminal (e.g., the higher layer of the first terminal) may release the PC5 interface (e.g., PC5 connection).

When the RLF is declared (e.g., when the RLF is detected), the first terminal may transmit the RLF declaration indicator to the base station (S808). The RLF declaration indicator may be transmitted to the base station through an RRC message, a MAC message, or a PHY message. For example, the RLF declaration indicator may be included in sidelink UE information or UE assistance information, and the sidelink UE information or the UE assistance information may be transmitted from the first terminal to the base station. The RLF declaration indicator may be information requesting release of the sidelink resources configured in the first terminal as well as information indicating that the first terminal has declared the RLF. Alternatively, in the step S808, the resource release indicator may be transmitted together with the RLF declaration indicator. The step S808 may be performed when the sidelink TM 1 or 3 shown in Table 2 is used (e.g., when sidelink resources are allocated by the base station). When the sidelink TM 2 or 4 described in Table 2 is used (e.g., when the first terminal autonomously selects the sidelink resources), the step S808 may not be performed.

The base station may receive the RLF declaration indicator or may receive the RLF declaration indicator and the resource release indicator from the first terminal. In this case, the base station may determine that the first terminal has declared the RLF. In addition, the base station may release the sidelink resources configured in the terminal(s) (e.g., the first terminal and/or the second terminal). The base station may allocate the released sidelink resources to another terminal (e.g., a third terminal). In this case, the released sidelink resources may be used for sidelink communication of another terminal (e.g., the third terminal) until the radio link between the first terminal and the second terminal is recovered.

In addition, the base station may reconfigure the sidelink resources (e.g., bandwidth part, resource pool, SPS resource, CG resource) for the first terminal (S809). Sidelink reconfiguration information including reconfiguration information of the sidelink resources may be transmitted to the terminal(s) (e.g., the first terminal and/or the second terminal) (S810). The sidelink reconfiguration information may be transmitted to the terminal(s) (e.g., the first terminal and/or the second terminal) through a combination of one or more among system information, an RRC message, a MAC message, and a PHY message.

On the other hand, when the RLF is declared, the first terminal may perform a recovery procedure of the radio link between the first terminal and the second terminal. For example, the first terminal may transmit a sidelink signal by using a different sidelink resource (e.g., a sidelink resource belonging to a different bandwidth part, a sidelink resource belonging to a different resource pool, another SPS resource, another CG resource, candidate sidelink resource) from the sidelink resource used in the step S803 and/or the step S805. Here, the sidelink signal may be a discovery signal, an SCI (e.g., SCI including scheduling information of initial transmission or retransmission sidelink data), and/or sidelink data (e.g., initial transmission or retransmission sidelink data). When a response (e.g., discovery response signal, HARQ response) to the sidelink signal is received from the second terminal, the first terminal may determine that the radio link between the first terminal and the second terminal has been recovered. Alternatively, when the response (e.g., discovery response signal, HARQ response) to the sidelink signal is not received from the second terminal, the first terminal may determine that the recovery procedure of the radio link between the first terminal and the second terminal has failed.

In an exemplary embodiment, if the number of HARQ NACKs and/or DTXs (e.g., consecutive HARQ NACKs and/or DTXs) received from the second terminal is greater than or equal to the number of RLF-HARQ responses, and the radio link recovery procedure fails, the first terminal may declare the RLF. Alternatively, if the number of HARQ NACKs and/or DTXs (e.g., consecutive HARQ NACKs and/or DTXs) received from the second terminal within the RLF period is greater than or equal to the number of RLF-HARQ responses, and the radio link recovery procedure fails, the first terminal may declare the RLF. That is, the step S807 may be performed after performing the recovery procedure of the radio link.

Figure 9:
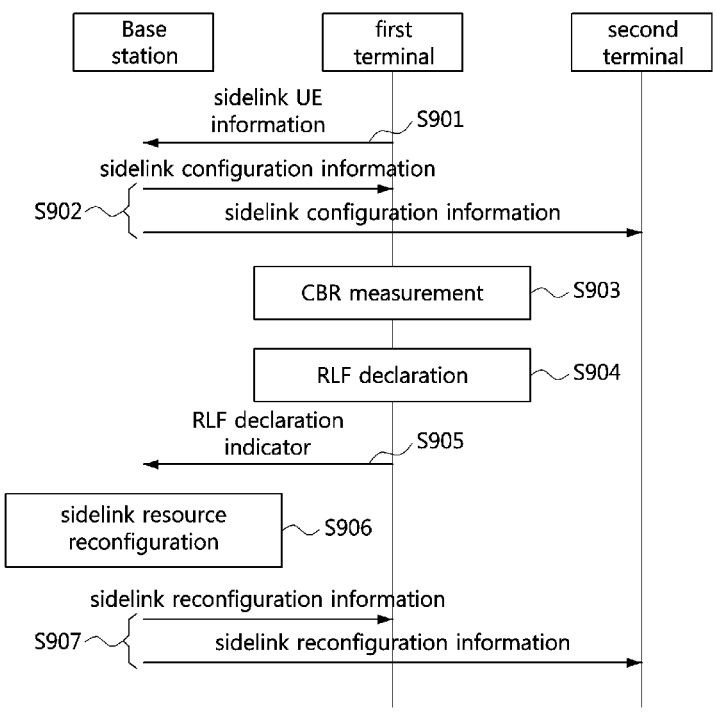
FIG. 9 is a sequence chart illustrating a third exemplary embodiment of a method for RLF detection and radio link recovery in a communication system supporting sidelink communication.

FIG. 9 is a sequence chart illustrating a third exemplary embodiment of a method for RLF detection and radio link recovery in a communication system supporting sidelink communication. As shown in FIG. 9, a communication system may include a base station, a first terminal, and a second terminal. The base station may be the base station 210 shown in FIG. 2. The first terminal may be the UE 235 shown in FIG. 2, and the second terminal may be the UE 236 shown in FIG. 2. Alternatively, the first terminal may be the UE 236 shown in FIG. 2, and the second terminal may be the UE 235 shown in FIG. 2. Each of the first terminal and the second terminal may be located in a vehicle. The base station, the first terminal, and the second terminal may be configured identically or similarly to the communication node 300 shown in FIG. 3. The first terminal and the second terminal may support the protocol stacks shown in FIGS. 4 to 6. The first terminal and the second terminal may be connected to the base station, and may perform sidelink communication based on scheduling of the base station. Alternatively, the first terminal and the second terminal may be located outside the coverage of the base station, and may perform sidelink communication without scheduling of the base station.

The first terminal may transmit sidelink UE information to the base station to initiate sidelink communication (e.g., V2X communication) (S901). The sidelink UE information may include capability information of the first terminal. For example, the sidelink UE information may include information indicating that sidelink communication is initiated. The base station may receive the sidelink UE information from the first terminal and may identify information element(s) included in the sidelink UE information. In addition, when the sidelink UE information is received from the first terminal, the base station may determine that the first terminal initiates sidelink communication. The base station may generate sidelink configuration information, and may transmit the sidelink configuration information (S902). The sidelink configuration information may be transmitted when sidelink UE information (e.g., sidelink UE information including the information indicating that sidelink communication is initiated) is received from the first terminal. Alternatively, the sidelink configuration information may be transmitted regardless of reception of the sidelink UE information. In this case, the step S901 may be omitted.

The sidelink configuration information may be transmitted through a combination of one or more among system information, an RRC message (e.g., RRC reconfiguration message, etc.), a MAC message, and a PHY message. For example, the sidelink configuration information may be transmitted through only an RRC message. Alternatively, some of the information element(s) included in the sidelink configuration information may be transmitted through an RRC message, and the other information element(s) included in the sidelink configuration information may be transmitted through a MAC message and/or a PHY message. The sidelink configuration information may include one or more information elements described in Table 3 below.

That is, the sidelink configuration information may include RLF-related parameter(s). In addition, the sidelink configuration information may further include information element(s) required for sidelink communication as well as the RLF-related parameter(s). For example, the information element(s) required for sidelink communication may include configuration information of a bandwidth part for sidelink, configuration information of a resource pool, configuration information of semi-persistent scheduling for sidelink, and/or configuration information of a configured grant (CG) for sidelink.

The terminal(s) (e.g., the first terminal and/or the second terminal) may receive the sidelink configuration information from the base station, and identify the information element(s) included in the sidelink configuration information. When the first terminal is located within the coverage of the base station, and the second terminal is located outside the coverage of the base station, the first terminal may receive the sidelink configuration information from the base station, but the second terminal may not receive the sidelink configuration information from the base station. In this case, the first terminal may transmit a MAC message and/or a PHY message including the sidelink configuration information to the second terminal. The second terminal may receive the MAC message and/or the PHY message from the first terminal, and identify the sidelink configuration information included in the MAC message and/or the PHY message. Alternatively, the sidelink configuration information may be predefined in the technical specification. In this case, since the communication nodes (e.g., the base station, the first terminal, and the second terminal) already know the sidelink configuration information, the step S902 may be omitted.

Meanwhile, the first terminal may perform a channel busy ratio (CBR) measurement operation (S903). For example, the first terminal may perform the CBR measurement operation on a radio link (e.g., PC5 interface) between the first terminal and the second terminal, and the CBR measurement operation may be performed in a predetermined time period. The predetermined time period may be the RLF period included in the sidelink configuration information or the RLF period defined in the technical specification. The first terminal may determine whether an RLF occurs based on the CBR measurement result. That is, the first terminal may compare the CBR measurement result with an RLF-CBR threshold included in the sidelink configuration information or an RLF-CBR threshold defined in the technical specification. When the CBR measurement result is less than the RLF-CBR threshold in the step S903, the first terminal may determine that an RLF has not occurred. On the other hand, when the CBR measurement result in the step S903 is equal to or greater than the RLF-CBR threshold, the first terminal may determine that the RLF has occurred. In this case, the first terminal may declare the RLF (S904).

For example, when the CBR measurement result in the radio link between the first terminal and the second terminal is greater than or equal to the RLF-CBR threshold, the lower layer of the first terminal (e.g., entity performing the PHY layer function) may transmit the RLF indicator (or, OSS indicator) to the higher layer (e.g., entity performing the RRC layer function) of the first terminal. When the RLF indicator is received from the lower layer of the first terminal, the higher layer of the first terminal may declare the RLF. When the RLF is declared, the first terminal may release sidelink resources between the first terminal and the second terminal. For example, the first terminal (e.g., the higher layer of the first terminal) may release the PC5 interface (e.g., PC5 connection).

When the RLF is declared (e.g., when the RLF is detected), the first terminal may transmit the RLF declaration indicator to the base station (S905). The RLF declaration indicator may be transmitted to the base station through an RRC message, a MAC message, or a PHY message. For example, the RLF declaration indicator may be included in sidelink UE information or UE assistance information, and the sidelink UE information or the UE assistance information may be transmitted from the first terminal to the base station. The RLF declaration indicator may be information requesting release of the sidelink resources configured in the first terminal as well as information indicating that the first terminal has declared the RLF. Alternatively, in the step S905, the resource release indicator may be transmitted together with the RLF declaration indicator. The step S905 may be performed when the sidelink TM 1 or 3 shown in Table 2 is used (e.g., when sidelink resources are allocated by the base station). When the sidelink TM 2 or 4 described in Table 2 is used (e.g., when the first terminal autonomously selects the sidelink resources), the step S905 may not be performed.

The base station may receive the RLF declaration indicator or may receive the RLF declaration indicator and the resource release indicator from the first terminal. In this case, the base station may determine that the first terminal has declared the RLF. In addition, the base station may release the sidelink resources configured in the terminal(s) (e.g., the first terminal and/or the second terminal). The base station may allocate the released sidelink resources to another terminal (e.g., a third terminal). In this case, the released sidelink resources may be used for sidelink communication of another terminal (e.g., the third terminal) until the radio link between the first terminal and the second terminal is recovered.

In addition, the base station may reconfigure the sidelink resources (e.g., bandwidth part, resource pool, SPS resource, CG resource) for the first terminal (S906). Sidelink reconfiguration information including reconfiguration information of the sidelink resources may be transmitted to the terminal(s) (e.g., the first terminal and/or the second terminal) (S907). The sidelink reconfiguration information may be transmitted to the terminal(s) (e.g., the first terminal and/or the second terminal) through a combination of one or more among system information, an RRC message, a MAC message, and a PHY message.

On the other hand, when the RLF is declared, the first terminal may perform a recovery procedure of the radio link between the first terminal and the second terminal. For example, the first terminal may transmit a sidelink signal by using a different sidelink resource (e.g., a sidelink resource belonging to a different bandwidth part, a sidelink resource belonging to a different resource pool, another SPS resource, another CG resource, candidate sidelink resource) from the sidelink resource used in the step S803 and/or the step S805. Here, the sidelink signal is a discovery signal, an SCI (e.g., SCI including scheduling information of initial transmission or retransmission sidelink data), and/or sidelink data (e.g., initial transmission or retransmission sidelink data).

When a response (e.g., discovery response signal, HARQ response) to the sidelink signal is received from the second terminal, the first terminal may determine that the radio link between the first terminal and the second terminal has been recovered. Alternatively, when the response (e.g., discovery response signal, HARQ response) to the sidelink signal is not received from the second terminal, the first terminal may determine that the recovery procedure of the radio link between the first terminal and the second terminal has failed. In an exemplary embodiment, when the CBR measurement result in the radio link between the first terminal and the second terminal is greater than or equal to the RLF-CBR threshold, the first terminal may declare the RLF. That is, the step S904 may be performed after performing the recovery procedure of the radio link.

Figure 10:
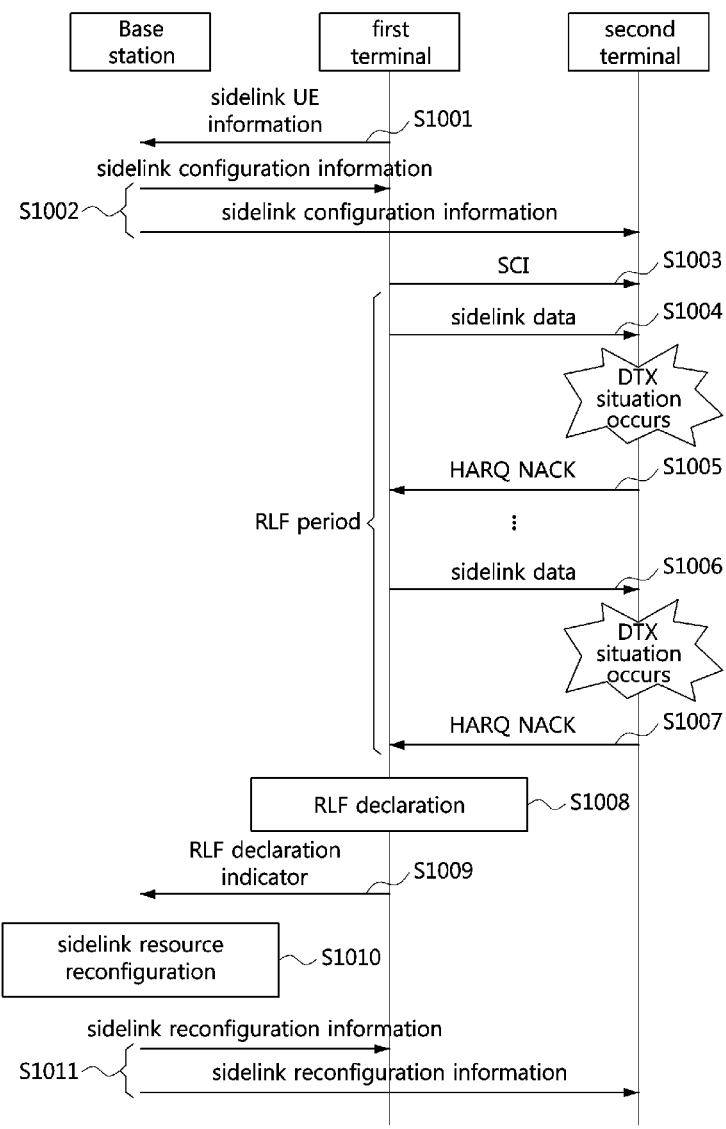
FIG. 10 is a sequence chart illustrating a fourth exemplary embodiment of a method for RLF detection and radio link recovery in a communication system supporting sidelink communication.

FIG. 10 is a sequence chart illustrating a fourth exemplary embodiment of a method for RLF detection and radio link recovery in a communication system supporting sidelink communication. As shown in FIG. 10, a communication system may include a base station, a first terminal, and a second terminal. The base station may be the base station 210 shown in FIG. 2. The first terminal may be the UE 235 shown in FIG. 2, and the second terminal may be the UE 236 shown in FIG. 2. Alternatively, the first terminal may be the UE 236 shown in FIG. 2, and the second terminal may be the UE 235 shown in FIG. 2. Each of the first terminal and the second terminal may be located in a vehicle. The base station, the first terminal, and the second terminal may be configured identically or similarly to the communication node 300 shown in FIG. 3. The first terminal and the second terminal may support the protocol stacks shown in FIGS. 4 to 6. The first terminal and the second terminal may be connected to the base station, and may perform sidelink communication based on scheduling of the base station. Alternatively, the first terminal and the second terminal may be located outside the coverage of the base station, and may perform sidelink communication without scheduling of the base station.

The first terminal may transmit sidelink UE information to the base station to initiate sidelink communication (e.g., V2X communication) (S1001). The sidelink UE information may include capability information of the first terminal. For example, the sidelink UE information may include information indicating that sidelink communication is initiated. The base station may receive the sidelink UE information from the first terminal and may identify information element(s) included in the sidelink UE information. In addition, when the sidelink UE information is received from the first terminal, the base station may determine that the first terminal initiates sidelink communication. The base station may generate sidelink configuration information, and may transmit the sidelink configuration information (S1002). The sidelink configuration information may be transmitted when sidelink UE information (e.g., sidelink UE information including the information indicating that sidelink communication is initiated) is received from the first terminal. Alternatively, the sidelink configuration information may be transmitted regardless of reception of the sidelink UE information. In this case, the step S1001 may be omitted.

The sidelink configuration information may be transmitted through a combination of one or more among system information, an RRC message (e.g., RRC reconfiguration message, etc.), a MAC message, and a PHY message. For example, the sidelink configuration information may be transmitted through only an RRC message. Alternatively, some of the information element(s) included in the sidelink configuration information may be transmitted through an RRC message, and the other information element(s) included in the sidelink configuration information may be transmitted through a MAC message and/or a PHY message. The sidelink configuration information may include one or more information elements described in Table 3 below.

That is, the sidelink configuration information may include RLF-related parameter(s). In addition, the sidelink configuration information may further include information element(s) required for sidelink communication as well as the RLF-related parameter(s). For example, the information element(s) required for sidelink communication may include configuration information of a bandwidth part for sidelink, configuration information of a resource pool, configuration information of semi-persistent scheduling for sidelink, and/or configuration information of a configured grant (CG) for sidelink.

The terminal(s) (e.g., the first terminal and/or the second terminal) may receive the sidelink configuration information from the base station, and identify the information element(s) included in the sidelink configuration information. When the first terminal is located within the coverage of the base station, and the second terminal is located outside the coverage of the base station, the first terminal may receive the sidelink configuration information from the base station, but the second terminal may not receive the sidelink configuration information from the base station. In this case, the first terminal may transmit a MAC message and/or a PHY message including the sidelink configuration information to the second terminal. The second terminal may receive the MAC message and/or the PHY message from the first terminal, and identify the sidelink configuration information included in the MAC message and/or the PHY message. Alternatively, the sidelink configuration information may be predefined in the technical specification. In this case, since the communication nodes (e.g., the base station, the first terminal, and the second terminal) already know the sidelink configuration information, the step S1002 may be omitted.

Meanwhile, the first terminal may generate an SCI (e.g., $1^{st}$ stage SCI and/or $2^{nd}$ stage SCI) including scheduling information of sidelink data, and may transmit the SCI to the second terminal (S1003). The sidelink data may be transmitted according to a transmission periodicity. Information indicating the transmission periodicity of the sidelink data may be included in the SCI transmitted in the step S1003. Alternatively, the transmission periodicity of the sidelink data may be configured by the base station. In this case, the information indicating the transmission periodicity of the sidelink data may be included in the sidelink configuration information transmitted in the step S1002, and the SCI transmitted in the step S1003 may include information indicating activation of the transmission periodicity of the sidelink data.

The second terminal may perform a monitoring operation on the sidelink to receive the SCI. When the SCI is not received (e.g., when a decoding operation of the SCI fails), the second terminal may transmit HARQ NACK (e.g., HARQ NACK that is a response to the SCI) to the first terminal. This operation may be performed when a DTX-NACK indicator included in the sidelink configuration information or a DTX-NACK indicator defined in the technical specification is enabled (e.g., when the DTX-NACK indicator is set to 1). That is, when the SCI is not received, the second terminal may determine that a DTX situation has occurred, and may transmit an HARQ NACK indicating the occurrence of the DTX situation to the first terminal. When the DTX-NACK indicator is set to 1 and the HARQ NACK is received from the second terminal, the first terminal may determine that the DTX situation has occurred in the second terminal. In this case, the first terminal may interpret the HARQ NACK received from the second terminal as an HARQ DTX.

After performing the step S1003, the first terminal may transmit sidelink data to the second terminal through a resource indicated by the SCI (S1004). The step S1004 may be performed when the HARQ NACK for the SCI is not received from the second terminal. Alternatively, the step S1004 may be performed regardless of whether the HARQ NACK for the SCI is received from the second terminal. The second terminal that has successfully received the SCI may perform a monitoring operation on the resource indicated by the corresponding SCI in order to receive the sidelink data. When the sidelink data is successfully received, the second terminal may transmit HARQ ACK to the first terminal in response to the sidelink data. On the other hand, when the sidelink data is not detected in the resource indicated by the SCI, the second terminal may determine that a DTX situation has occurred. When it is determined that the DTX situation has occurred and the DTX-NACK indicator is set to 1, the second terminal may transmit HARQ NACK to the first terminal (S1005). The first terminal may receive the HARQ NACK from the second terminal in response to the sidelink data transmitted in the step S1004. When the DTX-NACK indicator is set to 1, the first terminal may interpret the HARQ NACK received from the second terminal as an HARQ DTX. That is, the first terminal may determine that the DTX situation has occurred in the second terminal.

After the step S1004 or the step S1005, the first terminal may transmit one or more sidelink data (e.g., initial transmission or retransmission sidelink data) to the second terminal. For example, in the step S1006, the first terminal may transmit the sidelink data to the second terminal. In the step S1006, the sidelink data may be transmitted through a resource indicated by the SCI of the step S1003. Alternatively, separately from the step S1003, the first terminal may transmit an SCI including scheduling information of each sidelink data to the second terminal before transmitting the corresponding sidelink data.

When the sidelink data of the step S1006 is transmitted through the resource indicated by the SCI of the step S1003, the second terminal may perform a monitoring operation on the resource indicated by the SCI received in the step S1003 to receive the sidelink data. When the sidelink data is successfully received, the second terminal may transmit HARQ ACK to the first terminal in response to the sidelink data. On the other hand, when the sidelink data is not detected in the resource indicated by the SCI, the second terminal may determine that a DTX situation has occurred. When it is determined that the DTX situation has occurred and the DTX-NACK indicator is set to 1, the second terminal may transmit HARQ NACK to the first terminal (S1007). The first terminal may receive the HARQ NACK from the second terminal in response to the sidelink data transmitted in the step S1006. When the DTX-NACK indicator is set to 1, the first terminal may interpret the HARQ NACK received from the second terminal as an HARQ DTX. That is, the first terminal may determine that the DTX situation has occurred in the second terminal.

Alternatively, when the sidelink data of the step S1006 is transmitted through a resource indicated by another SCI (e.g., SCI including scheduling information of the sidelink data transmitted in the step S1006) instead of the SCI of the step S1003, the second terminal may perform a monitoring operation on the sidelink to receive the corresponding SCI. When the SCI is not received (e.g., when a decoding operation of the SCI fails), the second terminal may transmit HARQ NACK (e.g., HARQ NACK that is a response to the SCI) to the first terminal. The second terminal may determine that a DTX situation has occurred, and may transmit HARQ NACK indicating the occurrence of the DTX situation to the first terminal. When the DTX-NACK indicator is set to 1 and the HARQ NACK is received from the second terminal, the first terminal may determine that the DTX situation has occurred in the second terminal. In this case, the first terminal may interpret the HARQ NACK received from the second terminal as an HARQ DTX.

When the SCI (that is, the SCI different from the SCI in the step S1003) is successfully received, the second terminal may perform a monitoring operation on a resource indicated by the SCI to receive the sidelink data. When the sidelink data is successfully received, the second terminal may transmit HARQ ACK to the first terminal in response to the sidelink data. On the other hand, when the sidelink data is not detected in the resource indicated by the SCI, the second terminal may determine that a DTX situation has occurred. When it is determined that the DTX situation has occurred and the DTX-NACK indicator is set to 1, the second terminal may transmit HARQ NACK to the first terminal (S1007). The first terminal may receive the HARQ NACK from the second terminal in response to the sidelink data transmitted in the step S1006. When the DTX-NACK indicator is set to 1, the first terminal may interpret the HARQ NACK received from the second terminal as an HARQ DTX. That is, the first terminal may determine that the DTX situation has occurred in the second terminal.

Meanwhile, the first terminal may determine whether an RLF occurs based on the number of HARQ NACKs (e.g., information indicating that the DTX situation has occurred in the second terminal) received from the second terminal. Here, the first terminal may interpret the HARQ NACK received from the second terminal as an HARQ DTX or absence of an HARQ response. That is, the HARQ NACK may indicate the HARQ DTX. The first terminal may compare the number of HARQ NACKs (e.g., consecutive HARQ NACKs) received from the second terminal with the number of RLF-HARQ responses included in the sidelink configuration information or the number of RLF-HARQ responses defined in the technical specification. When the number of HARQ NACKs (e.g., consecutive HARQ NACKs) received from the second terminal is less than the number of RLF-HARQ responses, the first terminal may determine that no RLF has occurred. On the other hand, when the number of HARQ NACKs (e.g., consecutive HARQ NACKs) received from the second terminal is greater than or equal to the number of RLF-HARQ responses, the first terminal may declare an RLF (S1008).

As another method for detecting the RLF, the number of RLF-HARQ responses and the RLF period may be considered together. In this case, the first terminal compare the number of HARQ NACKs (e.g., consecutive HARQ NACKs) received from the second terminal within the RLF period included in the sidelink configuration information or the RLF period defined in the technical specification with the number of RLF-HARQ responses. If the number of HARQ NACKs (e.g., consecutive HARQ NACKs) received from the second terminal within the RLF period is less than the number of RLF-HARQ responses, the first terminal may determine that the RLF has not occurred. On the other hand, when the number of HARQ NACKs (e.g., consecutive HARQ NACKs) received from the second terminal within the RLF period is greater than or equal to the number of RLF-HARQ responses, the first terminal may declare the RLF (S1008).

The step S1008 may be performed as follows. For example, when the number of HARQ NACKs (e.g., consecutive HARQ NACKs) received from the second terminal is greater than or equal to the number of RLF-HARQ responses or when the number of HARQ NACKs (e.g., consecutive HARQ NACKs) received from the second terminal within the RLF period is equal to or greater than the number of RLF-HARQ responses, the lower layer (e.g., entity performing the PHY layer function) of the first terminal may transmit the RLF indicator (or OSS indicator) to the higher layer (e.g., entity performing the RRC layer function) of the first terminal. When the RLF indicator is received from the lower layer of the first terminal, the higher layer of the first terminal may declare the RLF. When the RLF is declared, the first terminal may release sidelink resources between the first terminal and the second terminal. For example, the first terminal (e.g., the higher layer of the first terminal) may release the PC5 interface (e.g., PC5 connection).

When the RLF is declared (e.g., when the RLF is detected), the first terminal may transmit the RLF declaration indicator to the base station (S1009). The RLF declaration indicator may be transmitted to the base station through an RRC message, a MAC message, or a PHY message. For example, the RLF declaration indicator may be included in sidelink UE information or UE assistance information, and the sidelink UE information or the UE assistance information may be transmitted from the first terminal to the base station. The RLF declaration indicator may be information requesting release of the sidelink resources configured in the first terminal as well as information indicating that the first terminal has declared the RLF. Alternatively, in the step S1009, the resource release indicator may be transmitted together with the RLF declaration indicator. The step S1009 may be performed when the sidelink TM 1 or 3 shown in Table 2 is used (e.g., when sidelink resources are allocated by the base station). When the sidelink TM 2 or 4 described in Table 2 is used (e.g., when the first terminal autonomously selects the sidelink resources), the step S1009 may not be performed.

The base station may receive the RLF declaration indicator or may receive the RLF declaration indicator and the resource release indicator from the first terminal. In this case, the base station may determine that the first terminal has declared the RLF. In addition, the base station may release the sidelink resources configured in the terminal(s) (e.g., the first terminal and/or the second terminal). The base station may allocate the released sidelink resources to another terminal (e.g., a third terminal). In this case, the released sidelink resources may be used for sidelink communication of another terminal (e.g., the third terminal) until the radio link between the first terminal and the second terminal is recovered.

In addition, the base station may reconfigure the sidelink resource (e.g., bandwidth part, resource pool, SPS resource, CG resource) for the first terminal (S1010). Sidelink reconfiguration information including reconfiguration information of the sidelink resource may be transmitted to the terminal(s) (e.g., the first terminal and/or the second terminal) (S1011). The sidelink reconfiguration information may be transmitted to the terminal(s) (e.g., the first terminal and/or the second terminal) through a combination of one or more among system information, an RRC message, a MAC message, and a PHY message.

On the other hand, when the RLF is declared, the first terminal may perform a recovery procedure of the radio link between the first terminal and the second terminal. For example, the first terminal may transmit a sidelink signal by using a different sidelink resource (e.g., a sidelink resource belonging to a different bandwidth part, a sidelink resource belonging to a different resource pool, another SPS resource, another CG resource, candidate sidelink resource) from the sidelink resource used in the step S1004 and/or the step S1006. Here, the sidelink signal is a discovery signal, an SCI (e.g., SCI including scheduling information of initial transmission or retransmission sidelink data), and/or sidelink data (e.g., initial transmission or retransmission sidelink data).

When a response (e.g., discovery response signal, HARQ response) to the sidelink signal is received from the second terminal, the first terminal may determine that the radio link between the first terminal and the second terminal has been recovered. Alternatively, when the response (e.g., discovery response signal, HARQ response) to the sidelink signal is not received from the second terminal, the first terminal may determine that the recovery procedure of the radio link between the first terminal and the second terminal has failed In an exemplary embodiment, if the number of HARQ NACKs (e.g., consecutive HARQ NACKs) received from the second terminal is greater than or equal to the number of RLF-HARQ responses, and the radio link recovery procedure fails, the first terminal may declare the RLF. Alternatively, if the number of HARQ NACKs (e.g., consecutive HARQ NACKs) received from the second terminal within the RLF period is greater than or equal to the number of RLF-HARQ responses, and the radio link recovery procedure fails, the first terminal may declare the RLF. That is, the step S1008 may be performed after performing the recovery procedure of the radio link.

The exemplary embodiments of the present disclosure may be implemented as program instructions executable by a variety of computers and recorded on non-transitory a computer readable medium. The non-transitory computer readable medium may include a program instruction, a data file, a data structure, or a combination thereof. The program instructions recorded on the non-transitory computer readable medium may be designed and configured specifically for the present disclosure or may be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a first terminal in a communication system supporting sidelink communication, the operation method comprising:
    receiving configuration information from a base station including one or more information elements used to declare a radio link failure (RLF);
    transmitting one or more sidelink data to a second terminal;
    performing a monitoring operation to receive one or more hybrid automatic repeat request (HARQ) responses for the one or more sidelink data from the second terminal;
    comparing a number of the one or more HARQ responses, indicating a discontinuous transmission (DTX), received within a predetermined time period and a preset threshold;
    declaring the RLF for a radio link between the first terminal and the second terminal when the number of the one or more HARQ responses indicating the DTX is greater than or equal to the preset threshold;
    transmitting, to the base station, information indicating that the RLF is declared; and
    receiving, from the base station, configuration information of sidelink resources between the first terminal and the second terminal in response to the information indicating that the RLF is declared,
    wherein the one or more information elements include a DTX-NACK (discontinuous transmission-negative acknowledgement) indicator indicating to transmit a NACK when a DTX situation occurs between the first terminal and the second terminal, and each of the one or more HARQ responses is the NACK, and
    wherein, when the number of the one or more HARQ responses indicating the DTX is less than the preset threshold, the RLF is not declared.

2. The operation method according to claim 1, wherein the one or more sidelink data are transmitted to the second terminal through semi-persistent scheduling (SPS) resources, configured grant (CG) resources, or resources scheduled by sidelink control information (SCI).

3. The operation method according to claim 1, further comprising transmitting, to the base station, information that the RLF is declared.

4. The operation method according to claim 1, further comprising, when the RLF is declared, performing an operation of releasing sidelink resources configured for the radio link in which the RLF is declared.

5. An operation method of a first terminal in a communication system supporting sidelink communication, the operation method comprising:
    receiving configuration information from a base station including one or more information elements used to declare a radio link failure (RLF);
    transmitting one or more sidelink data to a second terminal;
    performing a monitoring operation to receive one or more hybrid automatic repeat request (HARQ) responses for the one or more sidelink data from the second terminal;
    comparing a number of the one or more HARQ responses which are not received within a predetermined time period and a preset threshold;
    declaring the RLF for a radio link between the first terminal and the second terminal when the number of the one or more HARQ responses which are not received is greater than or equal to the preset threshold;
    transmitting, to the base station, information indicating that the RLF is declared; and
    receiving, from the base station, configuration information of sidelink resources between the first terminal and the second terminal in response to the information indicating that the RLF is declared,
    wherein the one or more information elements include a DTX-NACK (discontinuous transmission-negative acknowledgement) indicator indicating not to transmit a NACK when a DTX situation occurs between the first terminal and the second terminal, and
    wherein, when the number of the one or more HARQ responses which are not received is less than the preset threshold, the RLF is not declared.

6. The operation method according to claim 5, wherein the one or more HARQ responses are consecutive HARQ responses.

7. The operation method according to claim 5, wherein the configuration information includes the preset threshold that is a comparison criterion of the number of the one or more HARQ responses.

8. The operation method according to claim 5, further comprising transmitting, to the base station, information that the RLF is declared.

9. The operation method according to claim 5, further comprising, when the RLF is declared, performing an operation of releasing sidelink resources configured for the radio link in which the RLF is declared.

10. An operation method of a base station in a communication system supporting sidelink communication, the operation method comprising:
    transmitting configuration information including one or more information elements used to declare a radio link failure (RLF) for a sidelink to one or more terminals;
    receiving information indicating that an RLF is declared from a first terminal among the one or more terminals, the RLF being occurred between the first terminal and a second terminal;
    releasing a sidelink resource configured for a radio link associated with the RLF;
    reconfiguring a sidelink resource for the sidelink communication between the first terminal and the second terminal; and
    transmitting configuration information of the reconfigured sidelink resource to the first terminal,
    wherein the one or more information elements include information indicating a number of RLF-hybrid automatic repeat request (RLF-HARQ) responses, information indicating an RLF period, and a DTX-NACK (discontinuous transmission-negative acknowledgement) indicator, wherein the RLF is declared at the first terminal when the first terminal receives at least one HARQ response indicating a DTX and a number of the at least one HARQ response received within the RLF period is greater than or equal to the number of RLF-HARQ responses, and wherein the DTX-NACK indicator is set to a first value to indicate that a NACK is not transmitted when a DTX situation occurs between the first terminal and the second terminal, and the DTX-NACK indicator is set to a second value to indicate that the NACK is transmitted when the DTX situation occurs between the first terminal and the second terminal.

11. The operation method according to claim 10, wherein the configuration information includes information indicating a channel busy ratio (RLF-CBR) threshold.

* * * * *